Oct. 12, 1954
H. O. LOVEJOY, JR
MEANS FOR CONTROLLING OPERATION
OF A MOISTURE CONTROL DEVICE
2,691,707
Filed July 3, 1950
2 Sheets-Sheet 2
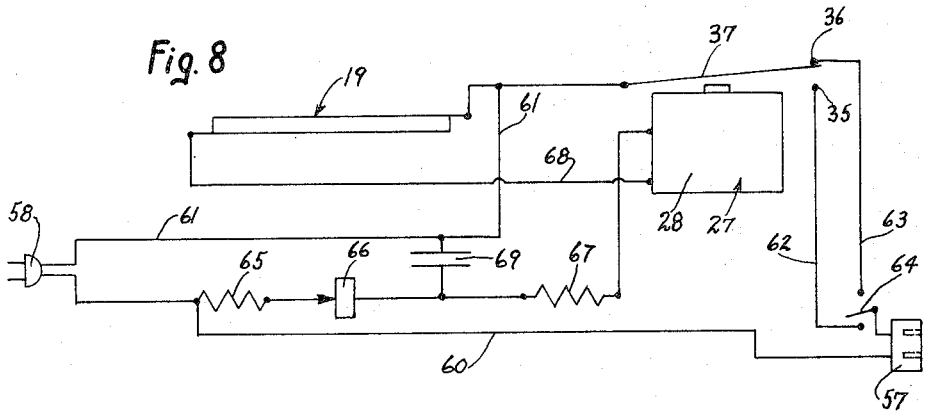
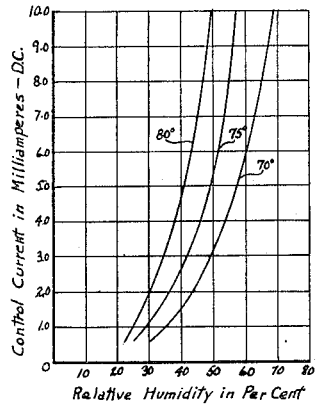
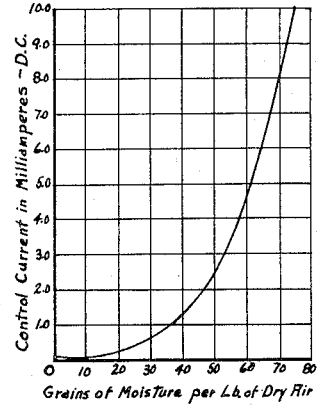
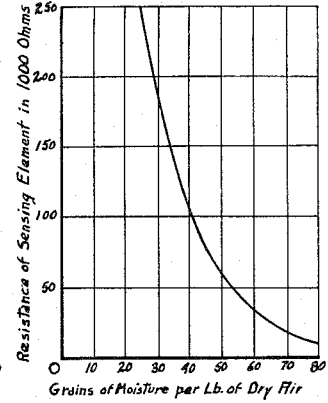
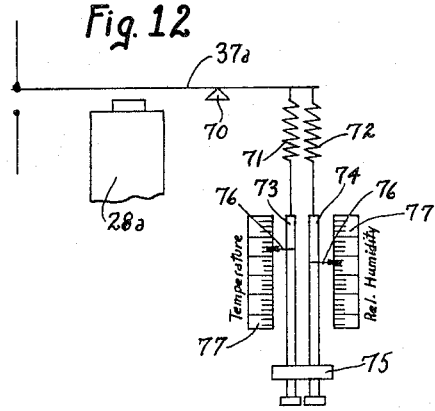
INVENTOR.
HARRY O. LOVEJOY JR.
BY
ATTORNEY Patented Oct. 12, 1954

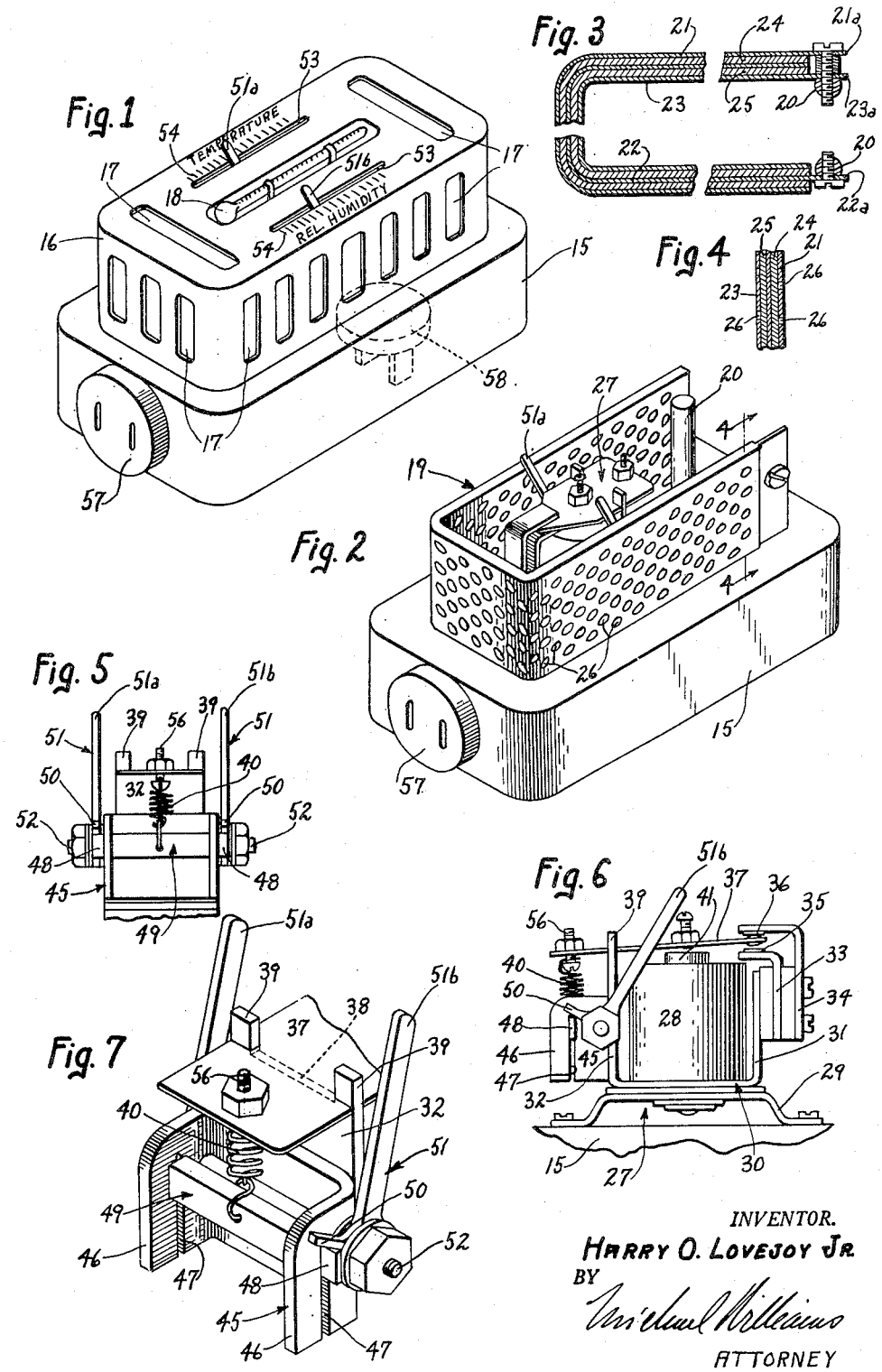

2,691,707

UNITED STATES PATENT OFFICE 2,691,707

MEANS FOR CONTROLLING OPERATION OF A MOISTURE CONTROL DEVICE

Harry O. Lovejoy, Jr., Medina, Ohio

Application July 3, 1950, Serial No. 171,802

4 Claims. (Cl. 200—87)

My invention relates to means for controlling operation of a moisture control device and the principal object of my invention is to provide new and improved control means of such character.

Heretofore, means for controlling operation of a moisture control device have been fragile in nature, unreliable in operation and expensive to manufacture. My invention provides a sturdy control which will withstand ordinary abuse without impairing its usefulness or its accuracy. Further, the control of my invention may be economically produced, yet possesses accuracy exceeding that of the more expensive devices now available. Also, my invention provides means whereby the control means may be set to maintain any selected relative humidity at a given or existing temperature condition.

In the drawings accompanying this specification and forming a part of this application, there is shown, for purposes of illustration, an embodiment which my invention may assume, and in these drawings:

Figure 1 is a perspective view of a control device disclosing an embodiment of my invention, Figure 2 is a view similar to Figure 1 but with an enclosing cover removed, Figure 3 is a fragmentary sectional view of a sensing element used in the embodiment herein disclosed, Figure 4 is a fragmentary enlarged sectional view corresponding generally to the line 4—4 of Figure 2, Figure 5 is a fragmentary end elevational view of a detail, Figure 6 is a fragmentary side elevational view of such detail, Figure 7 is a fragmentary perspective view of such detail, Figure 8 is a diagrammatic view disclosing electrical connection of the control means, Figures 9, 10 and 11 are charts generally illustrating control characteristics of the embodiment disclosed, and Figure 12 is a generally schematic view illustrating a slightly different form of a portion of the invention.

Referring to the drawings, the embodiment of the invention herein disclosed comprises a base 15 which is preferably formed of insulating material and is here shown as being generally oblong in shape. A cover 16, also preferably formed of insulating material, is detachably secured to the base 15 in any suitable manner, the cover 16 having openings 17 formed therein to provide for free circulation of air throughout its interior. If desired, a thermometer 18 may be carried by the cover 16, as shown in Figure 1.

A sensing element 19 is carried by the base 15 as by means of standards 20 which are secured to the base 15 and to which the sensing element is connected. In the embodiment herein disclosed, the sensing element is generally of horseshoe shape, as best illustrated in Figure 2, although it will be appreciated that it may be shaped otherwise than shown. Further, although the sensing element 19 is shown as of continuous horseshoe shape, it may be formed of sections suitably electrically and mechanically connected together, if desired.

The sensing element 19 is formed of substance which will readily absorb moisture from the surrounding air, such substance being interposed between metallic current conducting plates which are connected in electrical circuit with other parts of the control means. In the presently disclosed embodiment, three complementary metallic plates 21, 22 and 23 are provided, the plate 22 being interposed between plates 21 and 23 and having one end 22a disposed at one end of the sensing element 19 and connected to one of the standards 20 which may also serve as a binding post for electrical connection to the remainder of the circuit. Adjoining ends 21a and 23a of the plates 21 and 23, at the opposite end of the sensing element 19 are electrically and mechanically connected together and connected to the other standard 20 which serves as a binding post for further electrical connection.

Interposed between plates 21 and 22 and between plates 22 and 23 are strips 24 and 25 which are substantially coextensive with the plates to provide the ultimate in moisture absorption characteristics for the limited amount of area available because of space requirements. The strips 24 and 25, in the embodiment herein disclosed, are formed of asbestos which has been impregnated with a salt solution and dried. It has been found that this type of moisture-absorbing means is practical for general use; however, it will be appreciated that other moisture-absorbing means may be used for special requirements. The metallic plates 21, 22 and 23 are each provided with a multiplicity of apertures 26 so that a great proportion of the area of the strips 24, 25 is in communication with air circulating within the cover 16.

A relay 27 is supported from the upper surface (with respect to disposition of parts shown in the drawings) of the base 15, this relay being disposed within the confines of the sensing element 19 for purposes of compactness. The relay comprises an electromagnet 28 suitably supported from the base 15 by means of a bracket 29. The electromagnet is disposed within the confines of a U-shaped plate member 30 which has upright legs 31 and 32 on opposite sides of the electromagnet, as best seen in Figure 6.

The leg 31 supports, in insulated manner, spaced contact plates 33 and 34 which carry electrical contacts 35 and 36 respectively. Operating between the contacts 35 and 36 is a contact arm 37 which is adapted to engage with either of the contacts 35 and 36, for a purpose later to be disclosed. The contact arm 37 is mounted for pivotal movement on a ledge surface 38 formed between two ears 39 which extend upwardly from the leg 32. The contacts on the arm 37 are disposed at one side of the pivot, and a spring 40 is connected to the arm on the other side of the pivot.

The spring 40 normally holds the arm 37 in position shown in Figure 6 wherein the contact on the arm is in engagement with the contact 36. When the electromagnet is energized an amount to produce a magnetic pull sufficient to overcome the spring 40, the arm 37 moves to engagement with the core 41 of the electromagnet so that the contact of the arm 37 will engage the contact 35.

Means are provided to alter the force of the spring 40 in accordance with selected atmospheric requirements. In control of moisture conditions of air, the humidity and temperature conditions bear close relationship, and alteration of one condition affects a change in the other condition. For example, temperature and humidity taken together determine the sensation of warmth and influence the elimination of body heat. The human body, because of evaporation from its surface, behaves like a wet bulb thermometer and therefore dry air at a relatively high temperature may feel cooler than air of considerably lower temperature with a high moisture content. Accordingly, if the temperature of a room is to be changed, the relative humidity of the air in such room should also be changed if comfort conditions are to be maintained.

In the embodiment herein disclosed, the upright leg 32 carries a U-shaped bracket 45, opposite legs 46 of which are provided with upright slots 47 for respectively receiving ends 48 of a cross-bar 49. The ends 48 of the cross-bar extend beyond the outer surfaces of respective legs 46, as seen in Figures 5 and 7, for cooperation with a short leg 50 of a respective bell-crank lever 51. The levers 51 are pivotally carried, as at 52, by a respective leg 46, the longer leg of each lever being adapted to extend through a respective slot 53 in the cover 16, as seen in Figure 1. Graduations 54 are provided alongside the slots 53, one set of graduations being marked "Temperature" and the other set being marked "Humidity."

The spring 40 has one end adjustably secured to the arm 37, as at 56, and its other end secured to the mid-point of the cross-bar 49. The spring 40 should be appropriately chosen of tension power in relation to the magnetic pulling power of the relay 27. Any necessary adjustment for calibration for temperature and humidity conditions may be made by the adjustment 56.

The base 15 carries inlet and outlet current connections so that it may be handled as a unit. As seen in Figure 1, a female plug connection 57 extends from one end of the base and a male plug connection 58 extends from the bottom side of the base, the connection 58 having prongs which may be plugged into an electrical outlet of the type usually provided in residential and commercial buildings. The prongs of the plug leading to the humidifier may be inserted into the connection 57.

Figure 8 discloses electrical connection of the parts hereinbefore described, and in this figure the inlet plug 58 is adapted to be plugged into any commercially available alternating current outlet, one conductor 60 leading directly to the outlet plug 57. The other conductor 61 is connected to the arm 37 of the relay 27, the contacts 35, 36 having conductors 62, 63, respectively, which are connectable to the outlet plug 57, a switch or jumper strap 64 providing for connection of one or the other of the conductors 62, 63 to the outlet plug 57.

The sensing element 19 and relay 27 are included in a circuit which is in parallel to the circuit just described. As shown, a resistance 65 has one end connected to the conductor 60, the other end of the resistor being connected to one end of a rectifier 66 which permits current flow in the direction of the arrow. The rectifier may be of any suitable type, and for purposes of sturdiness and compactness is preferably of the copper oxide, stacked-disc type.

The opposite end of the rectifier 66 is connected to one end of a choke coil 67, and the opposite end of this coil is connected to one end of the winding of the electromagnet 28. The opposite end of the electromagnet winding is connected, by conductor 68 to one end of the sensing element 19, the opposite end of this element being connected to the conductor 61 to complete the circuit. Preferably, a condenser 69 is disposed between the conductor 61 and the conductor connecting the rectifier 66 with the choke coil 67.

By way of example, but by no means in way of limitation, in the embodiment herein disclosed the resistance 65 has a value of 18 to 22 ohms, the rectifier 66 is 90–100 ma., the condenser 69 is 20–40 mfd., the choke coil is 1000 ohms, and the relay is 10,000 ohms.

Thus, using a commercially available current source, such as 110 volt 60 cycle alternating current, it will be appreciated that my device provides switching means for the full amount of the current between the source and a humidifier or dehumidifier, yet the control circuit carries only a very small amount of current so as to reduce the possibility of accidents due to shock, overheating, and the like to a minimum.

In operation, if any moisture at all is present in the atmosphere surrounding the sensing element, such moisture will be picked up by the sensing element so that the latter passes current through the circuit in which it is included. Thus, in practically all cases, current is being passed by the sensing element to the electromagnet 28.

However, the electromagnet 28 will not establish sufficient magnetic pull to effect operation of the switch arm 37 until such magnetic pull is great enough to overcome the resistance created by the spring 40.

The device is adapted to operate humidification or dehumidification apparatus (depending upon the connection of the switch or bus bar 64) in relation to temperature, and the adjustment of the tension of the spring is provided to establish and maintain a comfortable relationship.

For example, the ordinary humidity device merely controls for humidity correction without regard to temperature. In use of my improved device, the temperature lever 51a (see Figures 1 and 7) is set to correspond with the setting of a temperature control device. If desired, the lever 51a may be connected in suitable manner to effect adjustment of a temperature control device. Thus, if the lever 51a is swung to an increased temperature setting, for example, without any change in the setting of the humidity lever 51b, the cross-bar 49 will be tilted and thus will change the tension of the spring 48 so that a predetermined amount of current passing through the sensing element 19 will effect operation of the relay to maintain the same relative humidity at the increased temperature as existed at the previous lower temperature. On the other hand, if the temperature lever is not changed, but the humidity lever is changed to increase the relative humidity, the cross-bar 49 will be tilted to change the tension of the spring to provide for greater relative humidity at the same temperature.

My improved device provides a sturdy means for electrically operating a switch for controlling humidification or dehumidification apparatus, and this device is so constructed and arranged that a fixed amount of current flowing through the sensing element will always operate the switch to maintain a definite relation between temperature and humidity. In this respect, attention is directed to the charts shown in Figures 9 through 11.

Referring to Figure 12, the construction therein disclosed shows in schematic manner a means for varying opposition of movement to a switch arm 37a which corresponds to the switch arm 37. As shown, the switch arm 37a is movable about a pivot 70 and is adapted to be attracted by an electromagnet 28a. A pair of springs 71, 72 are connected to the switch arm 37a, each spring being connected to a respective screw 73, 74, each screw being threaded through a stationary block 75, and each screw carrying a pointer 76 which is adapted to work over a scale 77. It will appreciated that as respective screws are turned, the tension force of respective springs will be changed so as to change the pulling force exerted on the switch arm 37a. Thus, the effect of the construction shown in Figure 12 is the same as that produced by the adjustment hereinbefore described.

In view of the foregoing, it will be apparent to those skilled in the art that I have accomplished at least the principal object of my invention, and it will also be apparent to those skilled in the art that the embodiment herein described may be variously changed and modified, without departing from the spirit of the invention, and that the invention is capable of uses and has advantages not herein specifically described; hence it will be appreciated that the herein disclosed embodiment is illustrative only, and that my invention is not limited thereto.

I claim:

1. A device for controlling flow of electrical current comprising a switch arm movable between two positions, resilient means for urging said switch arm to one position, spaced arms, each having a slot therein, a bar extending between said arms and having portions fitting within the slots thereof, said bar forming a movable anchor for said resilient means, and a lever pivotally connected by each of said arms, each lever having a portion engageable with said bar adjacent to a respective arm for effecting movement of that end of said bar.

2. A device for controlling flow of electrical current, comprising a generally U shaped bracket, an electromagnet supported by said bracket and disposed between the legs thereof, a switch arm pivotally supported by one of the legs of said bracket and movable between two positions, a spring connected to said switch arm for yieldably urging said arm to one position, a bar having an intermediate portion connected to said spring and having end portions slideably mounted for movement toward and away from said switch arm, and adjustment means engageable with respective end portions of said bar and each independently operable to shift a respective end of said bar to thereby vary the tension of said spring.

3. A device for controlling flow of electrical current, comprising a switch arm movable between two positions, a spring yieldably urging said arm to one position, a bar and guiding means therefor, said bar having an intermediate portion connected to said spring and having end portions slidably mounted in said guiding means for movement toward and away from said switch arm, and a plurality of adjustment means engageable with respective end portions of said bar and each independently operable to shift a respective end of said bar to thereby vary the tension of said spring.

4. A device for controlling flow of electrical current, comprising a switch arm movable between two positions, a spring having one end connected to said switch arm, a bar member having an intermediate portion connected to the other end of said spring, and a pair of adjustment members acting on respective end portions of said bar member and operable to selectively increase the distance between said respective bar end portions and said switch member to thereby effect variation of the effective tension of said spring.

References Cited in the file of this patent

UNITED STATES PATENTS

| Number | Name | Date |
|---|---|---|
| Re. 20,083 | Anderson et al. | Sept. 1, 1936 |
| 353,288 | Conklin, Jr. | Nov. 30, 1886 |
| 678,394 | Ghegan | July 16, 1901 |
| 688,554 | Skirrow | Dec. 10, 1901 |
| 1,000,314 | Zundel | Aug. 8, 1911 |
| 1,319,055 | Eggleston | Oct. 21, 1919 |
| 1,694,107 | Starkins | Dec. 4, 1928 |
| 1,724,197 | Hartzell | Aug. 13, 1929 |
| 1,891,702 | Allen | Dec. 20, 1932 |
| 1,949,685 | Hume | Mar. 6, 1934 |
| 2,031,146 | Dodge | Feb. 18, 1936 |
| 2,083,780 | Gille | June 15, 1937 |
| 2,113,474 | Edmonston | Apr. 5, 1938 |
| 2,302,320 | Hintze | Nov. 17, 1942 |
| 2,316,163 | Hignutt | Apr. 13, 1943 |
| 2,504,278 | Read | Apr. 18, 1950 |
| 2,526,453 | Bonnano | Oct. 17, 1950 |
| 2,550,779 | Cohen | May 1, 1951 |

FOREIGN PATENTS

| Number | Country | Date |
|---|---|---|
| 333,074 | Germany | Feb. 17, 1921 |